US008595784B2

(12) United States Patent
Vanderhoff et al.

(10) Patent No.: US 8,595,784 B2
(45) Date of Patent: Nov. 26, 2013

(54) SYSTEM FOR TESTING SET-TOP BOXES AND CONTENT DISTRIBUTION NETWORKS AND ASSOCIATED METHODS

(75) Inventors: Earl W. Vanderhoff, Cranston, RI (US); Alexander Laparidis, Mansfield, MA (US); Rick Halstead, Ashburn, VA (US); William S. Downey, Franklin, MA (US); Leonardo C. Chen, Medford, MA (US); Ronald J. Parrino, Medford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 946 days.

(21) Appl. No.: 11/620,158

(22) Filed: Jan. 5, 2007

(65) Prior Publication Data

US 2008/0168520 A1 Jul. 10, 2008

(51) Int. Cl.
*H04N 7/173* (2011.01)

(52) U.S. Cl.
USPC ............................ 725/131; 725/107; 725/116

(58) Field of Classification Search
USPC ........................................ 725/9–21, 107, 116
See application file for complete search history.

(56) References Cited

U.S. PATENT DOCUMENTS

| | | | | |
|---|---|---|---|---|
| 5,808,671 | A * | 9/1998 | Maycock et al. | 348/180 |
| 5,969,835 | A * | 10/1999 | Kamieniecki et al. | 398/33 |
| 6,718,374 | B1 * | 4/2004 | Del Sordo et al. | 709/220 |
| 6,734,898 | B2 * | 5/2004 | Zeidler | 348/183 |
| 7,010,598 | B2 * | 3/2006 | Sitaraman et al. | 709/224 |
| 8,335,239 | B2 * | 12/2012 | Kafka et al. | 370/477 |
| 2004/0259555 | A1 * | 12/2004 | Rappaport et al. | 455/446 |
| 2005/0039214 | A1 * | 2/2005 | Lorenz et al. | 725/105 |
| 2006/0023067 | A1 * | 2/2006 | Yang | 348/180 |
| 2006/0036907 | A1 * | 2/2006 | Inscoe et al. | 714/12 |
| 2006/0259629 | A1 * | 11/2006 | Usmani et al. | 709/227 |
| 2006/0269162 | A1 * | 11/2006 | Chen et al. | 382/286 |
| 2006/0271322 | A1 * | 11/2006 | Haggerty | 702/108 |
| 2007/0058730 | A1 * | 3/2007 | Bowra et al. | 375/240.28 |

* cited by examiner

*Primary Examiner* — Kieu Oanh T Bui

(57) ABSTRACT

Systems for testing set-top boxes and content distribution networks are provided. In general, systems and methods are described for simulating a set-top box subscriber base, remotely controlling the operations of the set-top boxes of the simulated subscriber base, and analyzing the quality of transmissions received by the set-top boxes. Houses, streets, and towns are simulated using multiple set-top boxes connected to a network. A controller is configured to remotely instruct the set-top boxes to access content from the network and to monitor the operations of the set-top boxes, and an analyzer is configured to monitor the quality of the transmissions received. Methods are also provided for testing set-top boxes and content distribution networks and for testing the quality of transmissions from one source as compared to another source.

23 Claims, 6 Drawing Sheets

Analyzer
16
Interface
10
34
33
32
SDI Encoder
Video Encoder
30
Video Switch
20
12
20
STBs/TV tuner
STBs/TV tuner
STBs/TV tuner
24
Serial STB Interface
Serial STB Interface
Serial STB Interface
26
IR and Power Control
IR and Power Control
IR and Power Control
28
Controller
36
14
15
18

SYSTEM FOR TESTING SET-TOP BOXES AND CONTENT DISTRIBUTION NETWORKS AND ASSOCIATED METHODS

BACKGROUND

The technology associated with set-top boxes is ever becoming more advanced, transforming set-top boxes from simple broadcast receivers for accessing cable television programming to specialized computers that are Internet Protocol (IP) enabled and interactive. Today's set-top boxes allow subscribers to access content such as video, audio, Internet web pages, interactive games, and more.

Unlike traditional cable distribution, a large part of modern set-top box communications, such as video-on-demand, telephony, and high-speed-data, are delivered as IP services across the same path. This architecture facilitates the possibility of undesired interactions between the different products, and congestion created from a high demand on one product may adversely affect the performance or reliability of another product. For example, the new release of a popular movie may create a high demand from subscribers to download and view the movie through the subscribers' set-top box. Such a high demand on the network may result in decreased quality of transmission of the movie from a central server to the individual subscribers' set-top boxes and may even affect the quality of other products distributed to other subscribers, such as subscribers attempting to access high-speed-data through their set-top boxes.

The capabilities and capacities of the network are generally discoverable after the fact—after problems have been detected by subscribers and reported to the content provider. Addressing the problems and repairing the network thus become reactive exercises with costs that include frustrated and dissatisfied subscribers, rather than proactive improvements that allow a content provider to maintain a competitive edge and anticipate the needs of its subscribers.

Content providers also typically continue to make new products and services available to subscribers. New products and services are generally implemented using new software and hardware, which may involve new technology that requires intense functional and repetitive testing. Again, waiting for subscribers to report problems is an impractical and inefficient way to test and streamline new offerings. For example, before a new local distribution site is connected to a network for distributing content to subscribers, the equipment and configurations at the new site must be tested, preferably on a scale that is reflective of the actual load and stress that the site will experience when it is on-line. Simply relying on subscribers to streamline the integration of the new site into the network is undesirable.

Currently, the testing of new sites as well as the on-going monitoring and maintenance of existing distribution sites is performed manually by trained technicians. Technicians at a particular site may, for example, view portions of a broadcast at various times during the day, sampling different stations for short periods of time and evaluating the quality of the transmission based on visual and auditory inspection. Such an analysis that relies largely on the human perception of anomalies through periodic sampling makes it difficult to identify all of the problems that may result during the distribution of content to a large subscriber base. For example, human beings are not capable of watching programming distributed to a set-top box on a continuous basis. One person simply cannot watch all channels being broadcast simultaneously and continuously twenty-four hours a day, despite the most heroic efforts. Thus, there may be intermittent degradations in the quality of the transmission on one channel that are not observed because the technician was either inspecting a different channel or not performing an inspection at all.

Even while the technician is viewing the programming on a particular channel, human physiology makes it impossible to continuously view anything, including a video transmission. The average person blinks more than 20 times a minute, with each blink lasting a quarter of a second; thus, some sporadic degradations in the transmission may go unnoticed. Also, human beings may not be able to discern all types of degradation. For example, a person may not be able to detect a "just noticeable" degradation, or may blame a momentary degradation on dry eyes or the like. As a result, numerous degradations may go unreported for long stretches of time.

Thus, there is a need for a system to test the capacity and reliability of a network that provides content to set-top box subscribers in a way that simulates the load and stress applied on the network by an actual subscriber base and allows repetitive functional testing of the network. In addition, there is a need for a system to monitor and analyze the quality of live transmissions over multiple channels simultaneously in a way that identifies infrequent and transient transmission degradations and allows a technician to perform further forensic analysis of problems.

BRIEF DESCRIPTION OF THE SEVERAL VIEWS OF THE DRAWING(S)

DETAILED DESCRIPTION

Exemplary embodiments now will be described hereinafter with reference to the accompanying drawings, in which exemplary embodiments and examples are shown. Like numbers refer to like elements throughout.

Systems and methods for testing set-top boxes and content distribution networks are provided in accordance with various exemplary embodiments. In general, systems and methods are described for simulating a set-top box subscriber base, remotely controlling the operations of the set-top boxes of the simulated subscriber base, and analyzing the quality of transmissions received by the set-top boxes. Houses, streets, and towns are simulated using multiple set-top boxes connected to a network. A controller is configured to remotely instruct the set-top boxes to access content from the network, and an analyzer is configured to monitor the operations of the set-top boxes as well as the quality of the transmissions received. As a result, network loading can be simulated and analyzed, and repetitive functional testing can be accomplished in a controlled environment.

Figure 1:
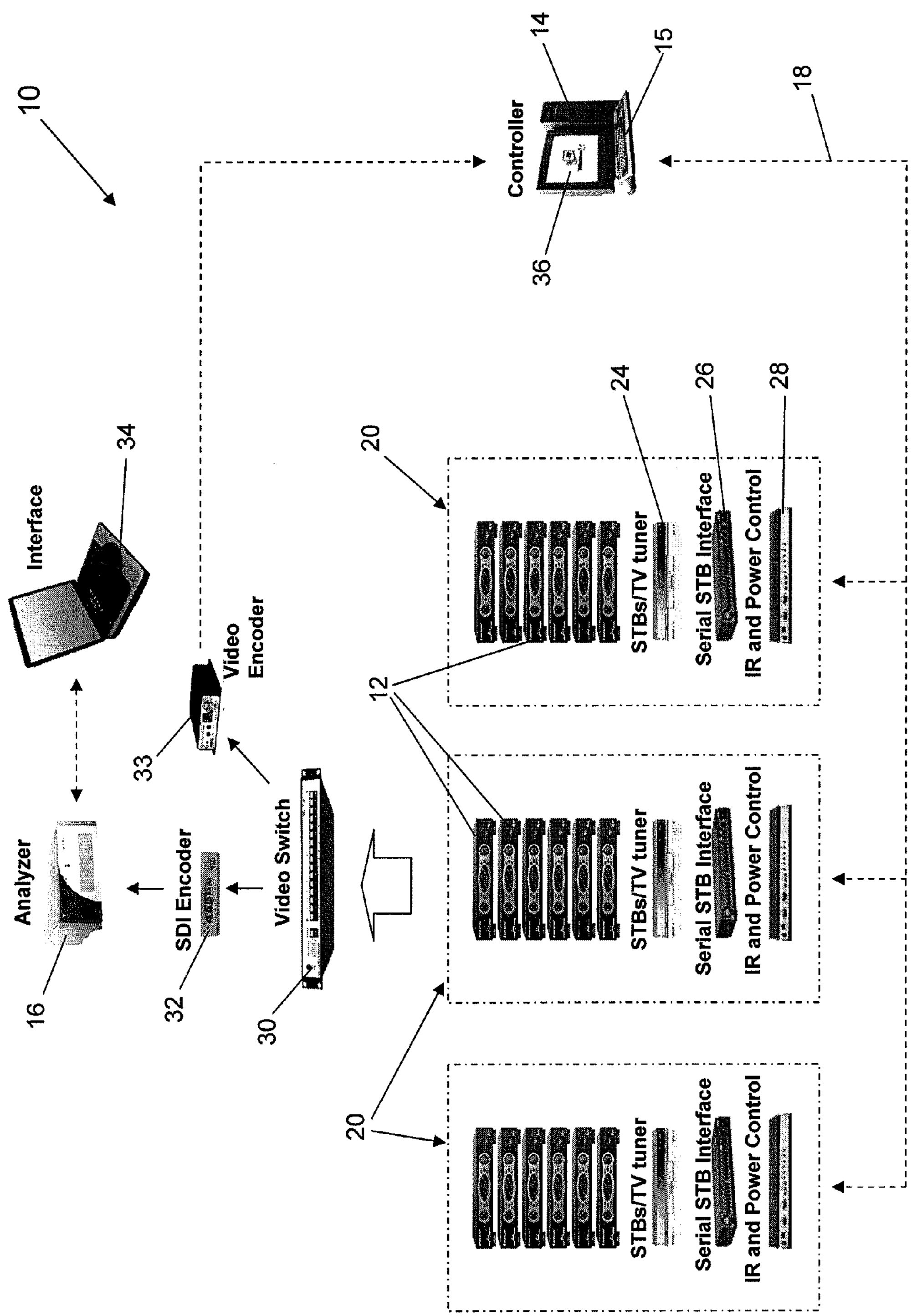
FIG. 1 is a schematic representation of one embodiment of a system for testing set-top boxes and content distribution networks.

Referring to FIG. 1, embodiments of the system 10 comprise a number of set-top boxes 12, a controller 14, and an analyzer 16. Additional network elements may be included, as illustrated in FIG. 1 and described below, to allow the controller 14 to communicate signals 18 to the various set-top boxes 12 instructing the set-top boxes 12 to perform certain operations, and to allow the analyzer 16 to communicate with the set-top boxes 12 to monitor the operations of the set-top boxes 12 and the associated transmissions.

The set-top boxes 12 are configured to receive content and interface with a communications network, such as the Internet. The set-top boxes 12 may receive content through an Ethernet cable, a satellite dish, a coaxial cable, an optical fiber, a telephone line, an antenna, such as a Very High Frequency (VHF) or Ultra High Frequency (UHF) antenna, or through other types of communication pathways. A set-top box 12 may also receive a signal by accessing on-board or loadable media, such as hard disk drives, compact discs (CDs), or digital video discs (DVDs). Content received by the set-top boxes 12 may include video, audio, Internet web pages, interactive games, as well as other types of content.

Figure 2:
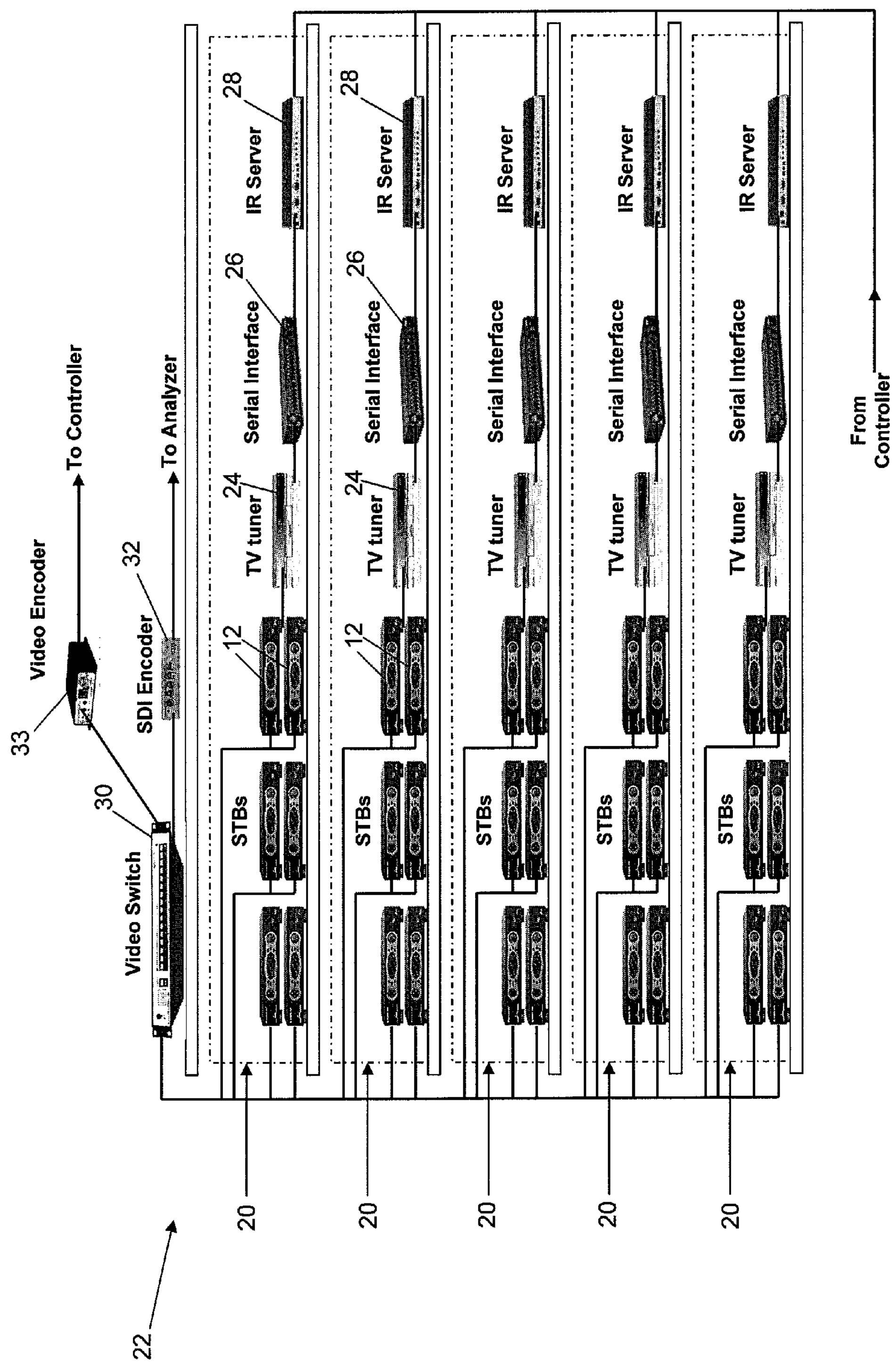
FIG. 2 is a schematic representation of an arrangement of set-top boxes in houses according to an embodiment of the system of FIG. 1.

Referring to FIG. 2, one or more set-top boxes 12 are arranged to simulate subscriber houses 20, with multiple houses 20 arranged to simulate streets 22 of subscribers, streets 22 arranged to simulate towns of subscribers, and so on to provide a virtual subscriber base for creating loads and stress on the network and analyzing how the network handles various types of demands. Each house 20 is set up to replicate an actual subscriber's house environment, from a content access standpoint.

For example, each house 20 may include multiple set-top boxes to replicate an actual subscriber location having set-top boxes 12 in several rooms of the house. FIG. 2, for example, shows five houses 20, each house 20 including six set-top boxes 12. Within each house 20, the set-top boxes 12 may be connected to a tuner 24, such as a television tuner, which converts antenna cable signals carrying content from the network into analog audio and video signals for use by the set-top boxes 12. The tuner 24 also makes it possible to select channels for receiving content. The set-top boxes 12 of each house 20 may also communicate with a serial interface 26, for example to determine a condition of the set-top box 12 or the internal states and processes of the set-top box 12, such as whether the set-top box 12 is powered on or what operation is being performed by the set-top box 12.

Referring to FIGS. 1 and 2, each set-top box 12 is configured to respond to signals 18 transmitted from the controller 14. A signal 18 may be, for example, an Infra Red (IR) signal from a remote control associated with the set-top box 12, or, in an exemplary embodiment, a digitized IR signal that is transmitted from the controller 14 to one or more designated set-top boxes 12. Set-top boxes may also be configured to receive serial commands, such as RS-232 commands, through the serial interface 26. A user input may be received by the controller 14, for example through a keyboard 15, a mouse, or other user input device, such that the signal 18 corresponding to a desired operation of one or more designated set-top boxes 12 is transmitted from the controller 14 to the designated set-top boxes 12 based on the input. For example, the controller 14 may be configured to function as a virtual remote controller as provided in U.S. Ser. No. 11/620,176, entitled "Apparatus for Remotely Controlling Set-Top Boxes and an Associated Method and Computer Program Product", filed concurrently, the content of which is incorporated by reference herein in its entirety.

Figure 3:
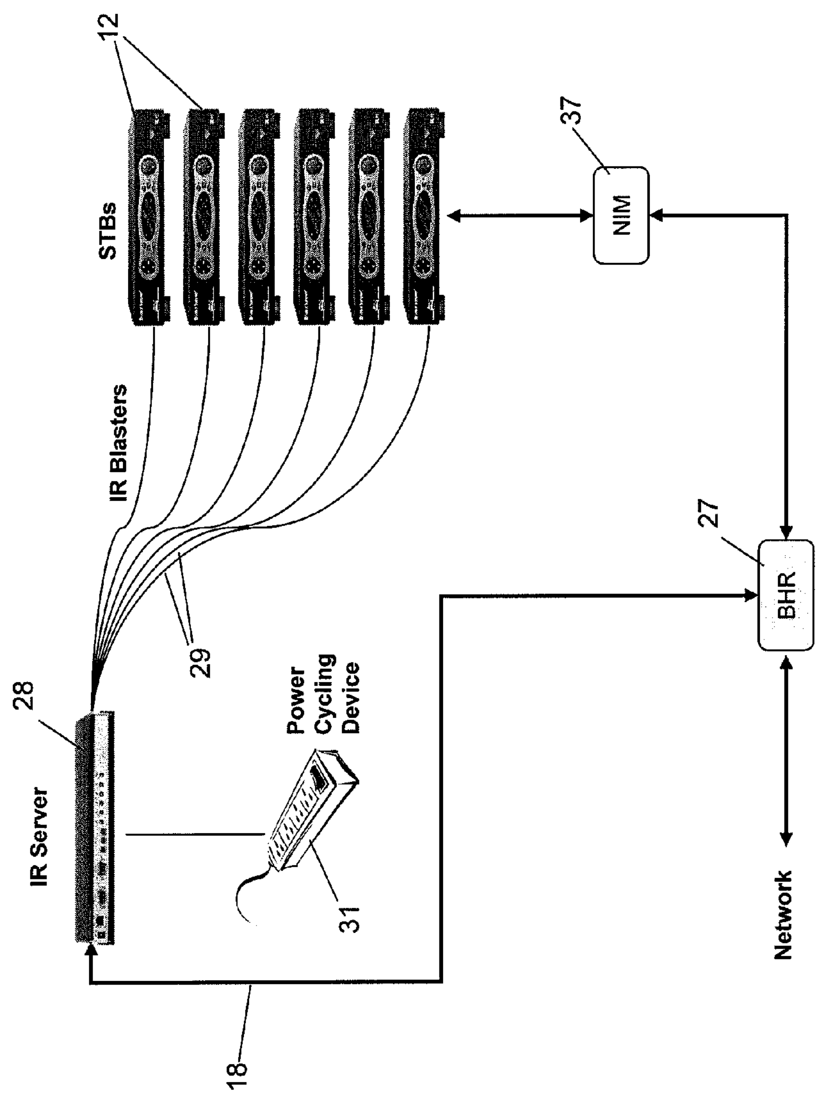
FIG. 3 is a schematic representation of an arrangement of set-top boxes in one house according to an embodiment of the system of FIG. 1.

Referring to FIGS. 2 and 3, each house 20 may include an IR server 28 to convert the digital signals 18 from the controller 14 into IR signals that can control the operations of the set-top boxes 12. For example, referring to FIG. 3, the IR server 28 may receive the digital signals 18 from the controller 14 via a broadband home router (BHR) 27 connected to an optical fiber network. The IR server 28 may convert the digital signals 18 into IR signals that are transmitted via cables having IR diodes, such as IR blasters 29, to the connected set-top boxes 12. As a result, the IR signals received by the set-top boxes 12 through the IR blasters 29 can instruct the respective set-top boxes 12 to execute operations in the same way as a remote control associated with the particular set-top box 12 when a button of the remote controller is pressed. The set-top boxes 12 of each house 20 may then access content on the network according to the instructions carried by the signals 18 through a Network Interface Module (NIM) 37 in communication with the broadband home router (BHR) 27.

For example, a user may desire to instruct a set-top box 12 to access and display a program menu that shows the various programs being broadcast on different channels accessible to the set-top box 12. In this example, the user may interact with the controller 14 to designate a particular set-top box 12 to command. For example, the user may select the particular set-top box 12 from a controller screen listing the set-top boxes 12 connected to the network by using a mouse. The user may then select the command MENU in a similar manner to cause the controller 14 to send a digitized signal 18 associated with the command MENU to the designated set-top box 12. The signal carrying the command MENU would then be transmitted from the controller 14 to the designated set-top box 12. As a result, the designated set-top box 12 should access and display the program menu, in generally the same manner as if the user had pressed the "MENU" button on the actual remote control associated with the designated set-top box 12.

Similarly, one or more set-top boxes 12 may be instructed by the controller 14 to perform any operation capable of being executed by the set-top box 12. Possible operations include, but are not limited to, accessing a live broadcast program to display, downloading and playing a movie, and navigating to a particular chapter in a movie, among many others. Multiple set-top boxes 12 may be instructed to perform the same operation nearly simultaneously. For example, twenty set-top boxes 12 located in various houses 20 and on various streets 22 may be instructed to download the same movie at the same time to observe the effects of such large scale demands on the network. Also, multiple commands may be recorded in advance through the interaction of the user with the controller 14 to build a command string that is thereafter transmitted via signals 18 to one or more designated set-top boxes 12. For example, a command string may be built to cause a set-top box 12 to access and display the program menu, scroll down to a certain program, select the program, display the program menu again, and select a different program. As a result, the different signals 18 associated with the various commands in the string would be transmitted by the controller 14 to the one or more designated set-top boxes 12 to instruct each set-top box 12 to execute each of the commands in sequence. In addition, the controller 14 may provide various control options, such as scheduling operations for certain times of the day, delaying a certain operation for an amount of time defined by the user, or saving a command string for later use, among other options.

Referring to FIG. 3, the system 10 may include a power cycling device 31 configured to disconnect the set-top boxes 12 of the house 20 from an A/C power source. For example, the IR server 28 may be configured to communicate with the power cycling device 31 such that the user may provide an input to the controller 14 to cause the IR server 28 to activate the power cycling device 31. In this way, the user may remotely isolate the set-top boxes 12 of a house 20 from A/C power, thereby simulating a power outage.

Multiple houses 20 may be arranged to simulate a street 22, as previously mentioned. For example, FIG. 2 illustrates a street 22 comprising five houses 20. Each set-top box 12 of a particular street 22 may be connected to a video switch 30 configured to communicate with the analyzer 16. In this way, any of the set-top boxes 12 connected to the video switch 30 may be selected, and the output from the selected set-top box 12 may be transmitted to the analyzer 16. In FIG. 2, a video switch 30 having at least thirty ports is illustrated for receiving output from each of the thirty set-top boxes 12 on the street 22 (6 set-top boxes in each house times 5 houses on the street). Alternatively, a video switch 30 having fewer ports may be used to communicate with the set-top boxes 12 of only one house 20. In that case, a street 22 having five houses 20 would require five video switches 30 with at least six ports, one video switch 30 for each house 20. The output from each of the five video switches 30 could then be transmitted to another video switch 30 dedicated to that street 22 to allow the analyzer 16 to access the output of a particular set-top box 12 of the street 22.

A Serial Digital Interface (SDI) encoder 32 may also be connected to the set-top boxes 12 of each street 22, as shown in FIG. 2. The SDI encoder 32 may be configured to convert the output from a selected set-top box 12, transmitted through the video switch 30, into a format that is compatible with the analyzer 16. For example, an SDI encoder 32 may be necessary for parsing the output of a set-top box 12 that is receiving High Definition broadcast transmissions from the network to make the transmissions compatible with the analyzer 16, such as by converting the output from baseband (NTSC component or composite, or S-Video) to uncompressed digital (SDI) for analysis.

Referring again to FIGS. 1 and 2, the output from the various set-top boxes 12 may also be connected to a video encoder 33, for example through a signal distributor (not shown). The video encoder 33 is configured to convert an analog video signal to a digital video signal using one of a variety of compression schemes, such as Motion Picture Experts Group (MPEG). The video encoder 33 may be configured to capture bitmap files of the video output from the set-top boxes 12 and to re-quantize the data at higher compression ratios. The controller 14 may then parse the digitized video to determine whether the requested IR command executed properly, for example by comparing the digitized video or a portion of the digitized video to a reference. For instance, the controller 14 may verify whether certain content (e.g., a movie) was accessed and displayed by a designated set-top box 12 in response to the appropriate signals 18 from the controller 14. The video encoder 33 may also temporarily store, or buffer, the data from the set-top boxes 12 to aid communication between the set-top boxes 12 and the controller 14, which may have different processing speeds, to allow a user to analyze the video on site, as will be described below.

The system 10 further includes an analyzer 16 configured to monitor at least one characteristic of the operation performed by the designated set-top boxes 12. As an example, an analyzer 16 may be a K-Will Corporation QuMax2000® video and audio quality monitoring device or other similar picture quality analyzer. The analyzer 16 may be configured to receive video and audio feedback from the designated set-top boxes 12 and to analyze the quality of the transmission received at the set-top box 12 in real time. In other words, the analyzer 16 may evaluate the transmission as the transmission would have been viewed by a person at the location of the designated set-top box 12. In effect, the analyzer 16 may take the place of a customer or a technician directly observing the result of a set-top box 12 operation, such as watching a movie that is accessed by the set-top box 12 and displayed on a connected television set. For example, the analyzer 16 may be configured to detect various forms of transmission degradation, such as tiling, freezing, and audio synchronization, as well as to detect perceptual degradations, such as a fuzzy, grainy, or dingy picture. As a result, the analyzer 16 may be configured to "watch" several channels of broadcast programming simultaneously and continuously to detect various anomalies in the transmission as it is received and displayed through the set-top box 12.

The analyzer 16 may include an interface 34 for allowing a user to configure the analyzer 16, as shown in FIG. 1. For example, the user may provide parameters to the analyzer 16 for monitoring the output of the set-top boxes 12. The user may specify how to monitor the output (i.e., the sampling frequency or duration), which types of degradation to monitor, and what to do if anomalies are detected. For example, the user may configure the analyzer 16 to report a condition of the designated set-top box 12. Conditions may include whether the set-top box 12 is powered on, whether the set-top box 12 is accessing the correct content according to the signal 18 from the controller 14, or what operation the set-top box 12 is executing.

The user may also configure the analyzer 16 to report information associated with the characteristics of the content that were analyzed. For example, this may include a description of the transmission analyzed, the parameters of the analysis, the types of degradations that were identified, and the locations in the transmission where the degradations were detected. The analyzer 16 may also be configured to store a copy of the content analyzed, for example upon identifying a transmission degradation. In this way, a technician receiving a report of an error or anomaly may be able to perform a forensic analysis on the particular portion of the transmission involved in an attempt to determine the source of the error and resolve the issue. In addition, the controller 14 may also be configured to re-transmit the signal 18 to the set-top boxes 12 failing to execute a requested operation.

The system 10 may also include a monitor 36 configured to display the content received by the designated set-top box 12. In other words, the monitor 36 may be configured to display the result of an operation performed by the set-top box 12 in a manner similar to a television set that is connected to the set-top box 12 at a subscriber's home. For example, a user transmitting signals 18 from a controller 14 to a designated set-top box 12 with the command to display the program menu may view the program menu on the monitor 36 to visually confirm that the set-top box is successfully executing the operation. Likewise, a user transmitting signals 18 instructing the set-top box 12 to download and play a particular movie may view the movie on the monitor 36 to visually verify that the correct movie was downloaded or to observe the quality of the transmission. The monitor 36 may be separate from the other components of the system 10, or it may be included with another component. For example, the monitor 36 may be a stand-alone computer that is receiving video and audio output from the set-top boxes 12 through a video switch 30. Or, as illustrated in FIG. 1, the monitor 36 may be part of the controller 14. If the monitor 36 is part of the controller 14, for example, the monitor 36 may serve to display controller options in one window, such as via a graphical user interface for controlling the various set-top boxes 12, and to display the output of the set-top boxes in another window, such as a window showing the movie being played.

The controller 14 may also be configured to interface with the set-top boxes 12, using the same scheduled and scripted methods as previously described. Thus the controller 14 may be used to apply and configure settings of the connected set-top boxes 12. For example, the access to content of a particular set-top box 12 or houses 20 of set-top boxes may be controlled through the controller interface 14 to allow the particular set-top boxes 12 more or less access to content on the network, simulating a subscription to only certain channels of programming.

Figure 4:
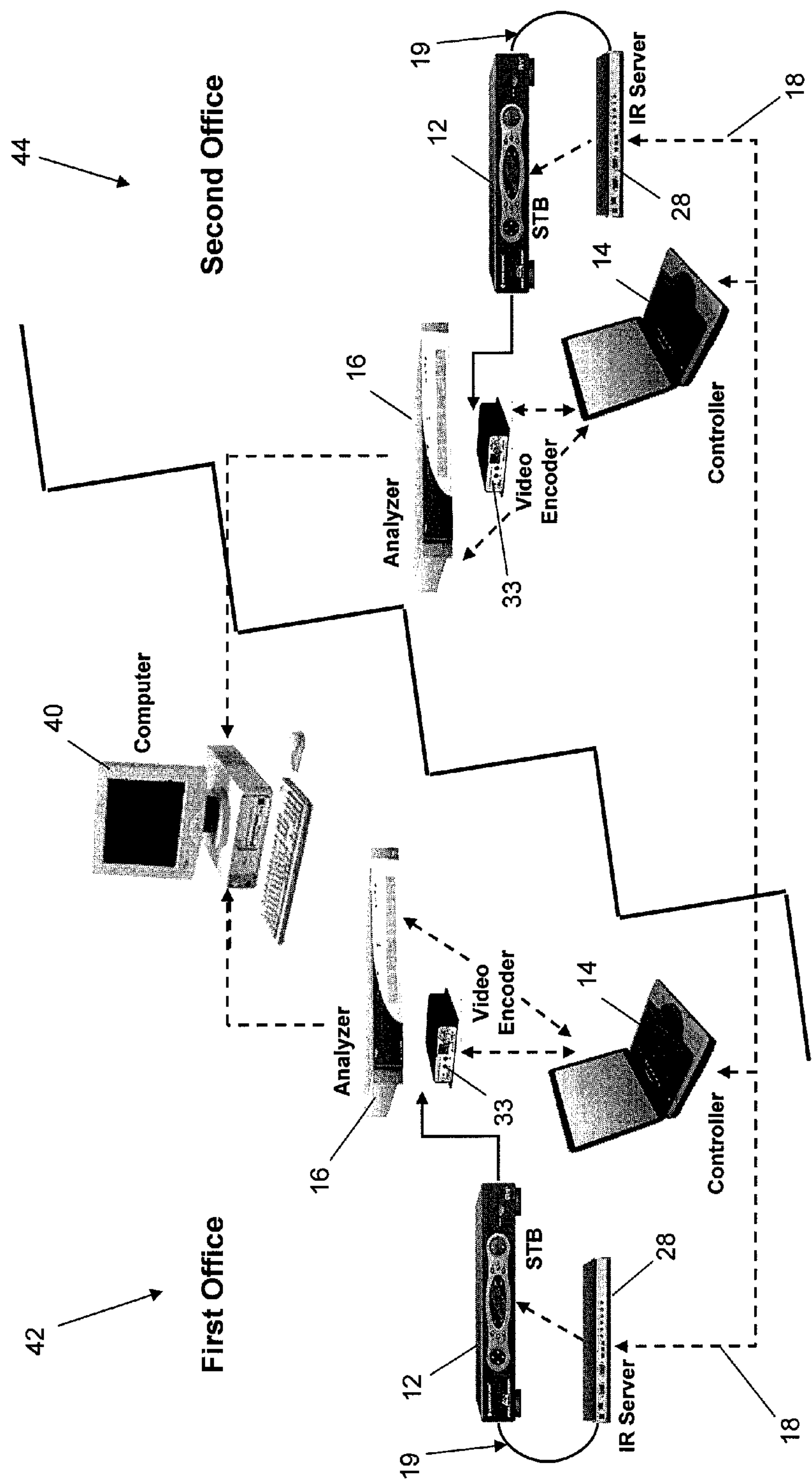
FIG. 4 is a schematic representation of one embodiment of a system for testing set-top boxes and content distribution networks wherein content received from two sources is compared.

The system 10 may be configured to compare the content received by the designated set-top boxes 12 to a predefined standard and to report the differences. Referring to FIG. 4, by way of example, a controller 14 at a first content distribution office 42 may direct a set-top box 12 at the first office 42 to execute a certain command. For example, the controller 14 may direct the set-top box 12 to access programming on a particular channel. The set-top box 12 should then receive the IR command via the IR server 28 and execute the command, for example accessing the specified content. Video output from the set-top box 12 may then be transmitted to the video encoder 33 for conversion into corresponding digital signals and the corresponding digital signals may then be communicated to the controller 14 for parsing and analysis to verify that the IR command executed properly, as previously described. In addition, serial feedback 19 from a serial port of the set-top box 12, such as RS-232 feedback, may be parsed by the controller 14 to verify that the IR command executed properly or to obtain other information regarding the status of the set-top box 12 and its internal processes.

Video feedback, such as the corresponding digital signals generated by the video encoder 33, is also received by the analyzer 16 in the example shown in FIG. 4. An input card in the analyzer 16 may strip the video feedback, leaving only its digital essentials, or, in other words, a representative telemetry signal. In effect, the analyzer 16 in this example collects a "DNA" sample of the output of the set-top box 12.

Similarly, a set-top box 12 at a second content distribution office 44 may be instructed to execute the same operation as the set-top box 12 at the first office 42. Proper execution of the command may be verified, as previously described, and a "DNA" sample may be obtained. The "DNA" samples from the first office 42 and the second office 44 may then be received and analyzed at either site 42, 44 or a third site by a computer 40. For example, the sample from one of the offices may serve as a reference, and the sample from the other office may be compared to the reference sample. Any differences between the samples may then be reported, for example to a technician overseeing the analysis.

For example, the reference sample may be obtained from a Video Hub Office (VHO) distributing content to a particular subscriber base, and the second sample may be obtained from a Video Serving Office (VSO) distributing content received from the VHO to a portion of the subscriber base served by the VHO. In this example, the VHO may serve a regional subscriber base covering subscribers in a mid-sized state, and the VSO may serve a local subscriber base covering a subset of the subscribers within the state, such as the subscribers in one of the cities in that state. Comparing the content from the VSO with the content from the VHO, the computer 40 may determine an indication of the quality of the transmission received from the VSO and report the differences between the two transmissions to a user, such as a technician. In this way, the quality of the transmissions broadcast from a particular content distribution office may be continuously monitored against a standard of content quality, such as the transmissions from a main office or VHO. Although the system of this embodiment is described to have certain elements, illustrated in FIG. 4 and described above, the system can be configured differently, for example incorporating elements not mentioned here, while still performing the same or comparable functions.

Figure 5:
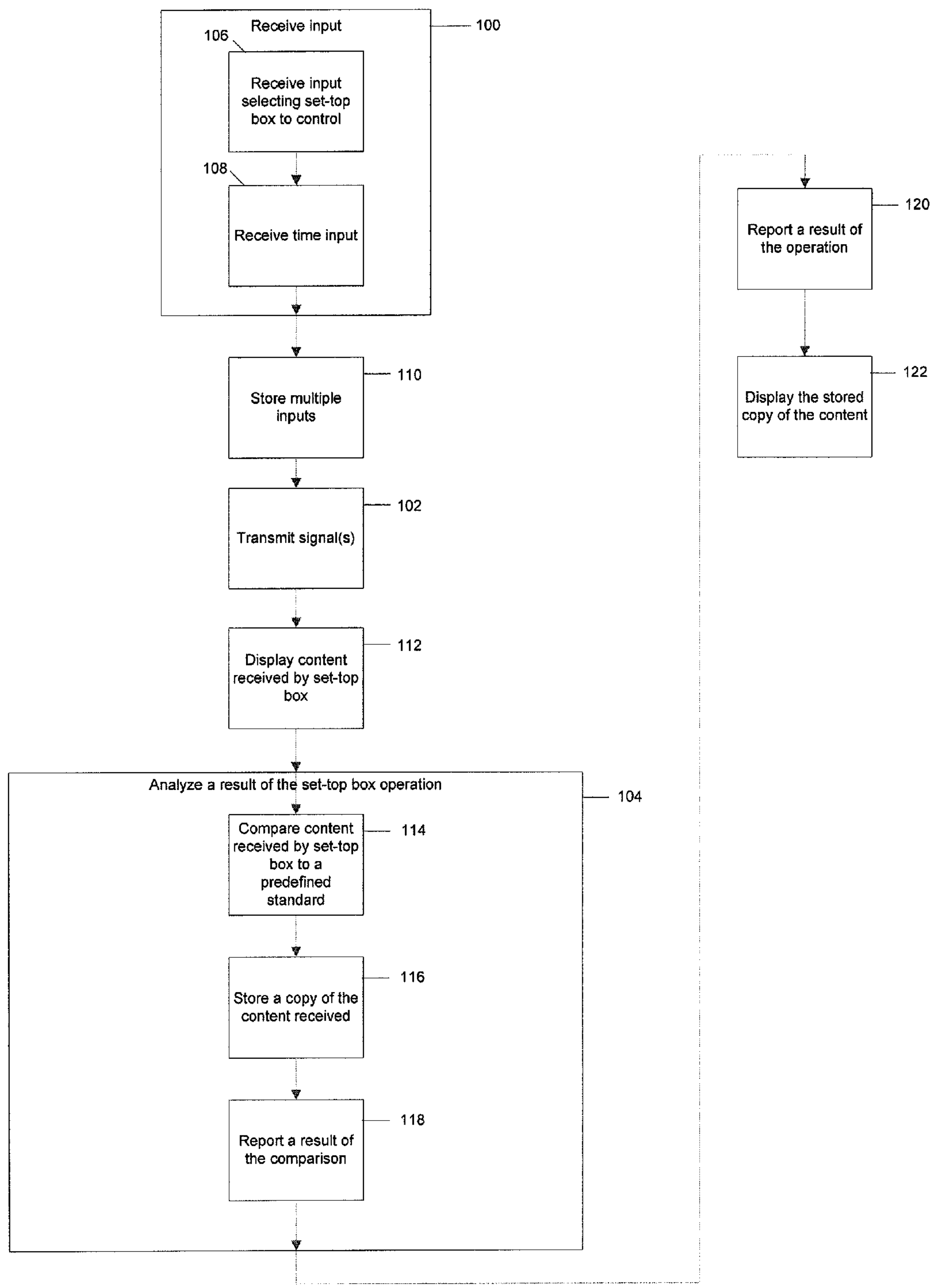
FIG. 5 is a flow chart illustrating embodiments of a method of testing set-top boxes and content distribution networks.

In other embodiments, a method for testing set-top boxes 12 and content distribution over a network is provided. Referring to FIG. 5, an input to control an operation of a set-top box is initially received, and a signal based upon the input is transmitted to the respective set-top box. A result of the operation of the set-top box 12, executed in response to the signal transmitted, is then analyzed. See FIG. 5, blocks 100-104. For example, as previously discussed, an input instructing one or more designated set-top boxes 12 to access a certain channel from the network may be received, the signal corresponding to this input may be transmitted to each designated set-top box 12, and the result of the operation, i.e., the broadcast programming of the particular channel, may be analyzed, for example to determine whether the correct channel was accessed or whether the quality of the transmission meets a predetermined standard, as discussed below.

Multiple inputs may be received to control one or more operations of one or more designated set-top boxes. An input selecting one or more of the connected set-top boxes 12 to control may be received. Likewise, an input defining a time to transmit the signals may be received, allowing a user to schedule one or more operations of the designated set-top boxes 12 in advance. See blocks 106-108. Multiple inputs, such as inputs to more than one set-top box 12 or inputs forming a string of commands, may be stored and then transmitted at the predefined time. See block 110. For example, the user may designate a street 22 of set-top boxes 12 to access a certain movie from the network at 2:00 A.M. and to play the movie. As a result, the signals instructing the set-top boxes of the designated street 22 to access and play the movie would be stored and then transmitted to the respective set-top boxes 12 at 2:00 A.M.

Furthermore, the content accessed by each set-top box 12 executing the operation according to the inputs received may be displayed, for example on a monitor 36 of the controller 14 or on a separate monitor or similar device connected to the set-top boxes 12. See block 112. Going back to the previous example, the movie that is accessed and played in response to the inputs received may be displayed. In this way, a user may visually verify that the designated set-top box 12 executed the desired operation and may also visually observe the quality of the resulting transmission as a subscriber would have viewed the transmission on his or her television set. The content may be displayed at any time after the signal or signals have been transmitted to the designated set-top box 12, and although FIG. 5 shows the step of block 112 as occurring before block 104, the content may be displayed before, after, or concurrent with the analysis of the result of the operation.

Content received by the set-top box 12 may be analyzed in a variety of ways. As previously described, a user may provide parameters to a picture quality analyzer or similar device to perform the analysis, shown generally in block 104. For example, a user may define an acceptable amount of tiling as a standard, against which the analyzer 16 would evaluate feedback from the receiving set-top box 12. Alternatively, content received by the set-top box 12 may be compared to a predefined standard in the form of a transmission input. See block 114. Referring to FIG. 4, video and audio feedback 46 may be transmitted from two or more sources, for example from a set-top box 12 at a first content distribution office 42 and a set-top box 12 at a second content distribution office 44, to one or more analyzers 16 for obtaining a representative telemetry signal corresponding to the output of the set-top boxes 12. One of these representative telemetry signals, such as the signals from the first office 42, may be designated as a standard, such that difference between the signals from the second office 44 and the signals from the first office 42 may be recognized as discrepancies or degradations in the transmission quality, for example by a computer 40 analyzing the signals.

The comparison of two or more transmissions, such as is shown in FIG. 4, may be reported upon completion of the analysis. See FIG. 5, block 118. For example, discrepancies between content received at two sources may be noted and reported to a user. The report may be in the form of a communication to a designated user, such as a text message or e-mail, or it may be in the form of an alarm, such as an audible sound indicating discovered discrepancies.

Regardless of how the analysis is performed, a copy of the content received by the set-top box may be stored for further review and analysis by a user, as shown in block 116 of FIG. 5. For example, differences between content received from the first office 42 and the second office 44, in the previous example illustrated in FIG. 4, may trigger the storage of a copy of the content received from the second office 44, or the content received from both offices. Similarly, a copy of any content failing to meet a predefined standard or the analysis of which exceeds certain parameters may be automatically stored so that a technician, for example, may manually inspect the transmission in an effort to identify and resolve any issues. Storage of content received by the set-top boxes 12 may be triggered by a failure or recognized degradation, as described above, or the storage may be automatic and independent of the result of the analysis.

The result of an operation may also be reported to a user, as shown in FIG. 5, block 120. For example, a command instructing a set-top box 12 to download and play a movie may be successfully executed, generating a report to the user that the operation was successfully executed. Alternatively, the set-top box 12 may not have downloaded or played the movie, or the set-top box 12 may have downloaded and played the wrong movie. In that case, a report may be generated informing the user that the operation had failed. Again, the report may be in the form of a communication to a designated user, for example a text message or an e-mail, or it may be in the form of an alarm alerting the user to a failed operation. The controller 14 may also be configured to retransmit the signal 18 to the set-top boxes 12 failing to execute the requested operation.

In the case that content received by the set-top box 12 is stored for further analysis by a user, such as a technician, such content may be displayed, as shown in block 122. For example, a technician, upon receiving an e-mail notifying him that an operation was unsuccessful, may call up the stored copy of the content received by the set-top box 12 attempting to execute the desired operation. The stored copy, for example, may be displayed on a monitor 36, such as a monitor 36 at the controller 14, as shown in FIG. 1, at the analyzer 16, or otherwise located.

In another embodiment, a method for testing the quality of transmissions from one source as compared to another source is provided. Content is initially received at a first office and at a second office. See FIG. 6, blocks 130-132. The first office has a predefined territory that is served. For example, the first office may be a Video Hub Office (VHO) distributing content to subscribers in a particular state. The second office is responsible for distribution of the content throughout only a portion of the territory of the first office. For example, the second office may be a Video Serving Office (VSO) distributing content to subscribers in one county of the state served by the VHO. The VSO may receive broadcast transmissions from the VHO for distribution to the VSO subscriber base. For example, the VSO may receive national or regional programming and may add local programming to the transmissions before distributing the content to the VSO subscriber base. Content may be received at the first office before, after, or at the same time that content is received at the second office.

An indication of the quality of the content received at the second office is then determined based on a comparison of the content received at the second office with the content received at the first office. See block 134. For example, the content received at the VSO may be compared to the content received at the VHO to determine whether and what kind of degradation in the transmission occurred. In this way, for example, new equipment that is being installed at the VSO, or even a new VSO facility may be tested prior to the distribution of content to subscribers to ensure that the quality of transmissions from the VHO is not diminished as it is routed through the VSO for ultimate distribution to the subscribers.

The content received at the second office, such as the VSO, may also be displayed, as shown in block 136. The display of the content may occur before, after, or concurrent with the determination of an indication of quality. For example, a technician may be able to view a broadcast on a particular channel in real time at the VSO as the transmission is being analyzed against the content received at the VHO. In this way, the technician may be able to visually verify that the correct content is being received and may be able to troubleshoot errors as they occur. In addition, the content received at the second office may be stored if the indication of quality determined does not meet a predefined standard. See block 138. For example, if the content received at the second office is dingy, or not as bright as the content received at the first office, the content received at the second office may be stored so that a technician may be able to perform further analysis on the transmission not meeting the standard.

Figure 6:
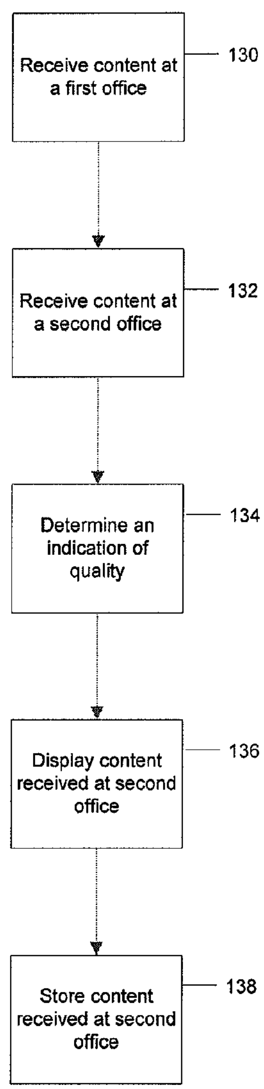
FIG. 6 is a flow chart illustrating embodiments of a method of testing the quality of transmissions from one source as compared to another source.

It is understood that the operations described for the illustrated methods of FIGS. 5 and 6 may be performed through hardware, software, or combination thereof. Therefore embodiments may take the form of hardware systems and/or apparatuses, software, or combinations thereof. As an example, embodiments may include a computer program product that includes a computer-readable storage medium (e.g., memory) and one or more executable portions (e.g., software) stored by the computer-readable storage medium for performing the operations described herein upon execution thereof. Referring to FIG. 1, for example, the executable portions may be stored and executed by various of the system elements including, for example, the controller 14 and the analyzer 16 to perform their respective functions.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A system comprising:

a plurality of set-top boxes configured to receive content and to interface with a communications network;

a controller configured to receive a user input and to transmit a digitized infrared signal based upon the user input;

an infrared server configured to receive the digitized infrared signal from the controller, convert the digitized infrared signal into an infrared signal, and transmit the infrared signal to at least one designated set-top box within the plurality of set-top boxes to control an operation of the at least one designated set-top box; and an analyzer in communication with the set-top boxes and configured to receive video and audio feedback from the at least one designated set-top box and use the received video and audio feedback to analyze in real time at least one of a transmission degradation and a perceptual degradation associated with the operation controlled by the infrared signal and executed by the at least one designated set-top box by analyzing the received video and audio feedback to identify at least one degradation in the video and audio feedback, wherein the identified degradation is identified as one of the transmission degradation and the perceptual degradation.

2. The system of claim 1 further comprising a power cycling device configured to isolate the at least one designated set-top box from an A/C power source to simulate a power outage.

3. The system of claim 1 wherein the analyzer is configured to report a result of the analysis, wherein the report includes characteristics of the at least one identified degradation.

4. The system of claim 1 wherein the analyzer is configured to store a copy of the content received by the at least one designated set-top box in response to the identification.

5. The system of claim 1 wherein the analyzer is configured to convert an output of the at least one designated set-top box to a representative telemetry signal.

6. The system of claim 5 further comprising a computer configured to receive a plurality of representative telemetry signals and to compare at least one of the representative telemetry signals to a reference representative telemetry signal.

7. The system of claim 1 further comprising a video encoder configured to receive an analog video output of the at least one designated set-top box and to convert the analog video output to a digital video signal.

8. The system of claim 7 wherein the controller is configured to parse the digital video signal to analyze execution of the operation.

9. The system of claim 1 further comprising a monitor configured to display the content received by the at least one designated set-top box.

10. The system of claim 1 wherein the controller is configured to simultaneously control the operation of multiple set-top boxes.

11. The system of claim 1 wherein the plurality of set-top boxes is configured to simulate a set-top box subscriber base.

12. The system of claim 1 wherein the infrared server is configured to transmit the infrared signal to the at least one designated set-top box via a cable having one or more infrared diodes.

13. The system of claim 1, wherein the transmission degradation comprises at least one of a tiling degradation, a freezing degradation, and an audio synchronization degradation, and wherein the perceptual degradation comprises at least one of a fuzzy picture, a grainy picture, and a dingy picture.

14. A method comprising:

receiving an input to control an operation of at least one designated set-top box from among a plurality of set-top boxes coupled to a communications network;

transmitting a digitized infrared signal based upon the input to control the operation of the at least one designated set-top box;

receiving the digitized infrared signal with an infrared server;

converting the digitized infrared signal into an infrared signal;

transmitting the infrared signal from the infrared server to the at least one designated set-top box;

receiving video and audio feedback from the at least one designated set-top box;

analyzing, based on the received video and audio feedback and in real time, at least one of a transmission degradation and a perceptual degradation associated with the operation controlled by the infrared signal and executed by the at least one designated set-top box, wherein the analyzing includes identifying at least one degradation in the video and audio feedback, wherein the identified degradation is identified as one of the transmission degradation and the perceptual degradation.

15. The method of claim 14 further comprising displaying content received by the at least one designated set-top box executing the operation.

16. The method of claim 14 further comprising reporting the result of the analysis wherein, the report includes characteristics of the at least one identified degradation.

17. The method of claim 14 further comprising receiving an input defining a scheduled time for transmitting the digitized infrared signal.

18. The method of claim 17 further comprising:

receiving a plurality of inputs to control one or more operations of the at least one designated set-top box;

storing the plurality of inputs; and transmitting a plurality of digitized infrared signals associated with the plurality of inputs at a scheduled time.

19. The method of claim 14 wherein the identifying of the at least one degradation in the video and audio feedback comprises:

comparing content received by the at least one designated set-top box executing the operation to a predefined standard;

storing a copy of the content received by the at least one designated set-top box; and reporting a result of the comparison.

20. The method of claim 19 further comprising displaying the stored copy of the content received by the at least one designated set-top box.

21. The method of claim 14, wherein the transmission degradation comprises at least one of a tiling degradation, a freezing degradation, and an audio synchronization degradation, and wherein the perceptual degradation comprises at least one of a fuzzy picture, a grainy picture, and a dingy picture.

22. A system comprising:

a plurality of set-top boxes operably coupled to a communications network and configured to simulate network loading of a set-top box subscriber base in a controlled environment;

an infrared server connected to the plurality of set-top boxes;

a controller that receives a user input and transmits a digitized infrared signal based on the user input to the infrared server, wherein the infrared server receives the digitized infrared signal from the controller, converts the digitized infrared signal into an infrared signal, and transmits the infrared signal to at least one designated set-top box within the plurality of set-top boxes to control an operation of the at least one designated set-top box; and an analyzer in communication with the plurality of set-top boxes and that receives video and audio feedback from the at least one designated set-top box, uses the received video and audio feedback to analyze in real time at least one of a transmission degradation and a perceptual degradation associated with the operation controlled by the infrared signal and executed by the at least one designated set-top box by analyzing the received video and audio feedback to identify at least one degradation in the video and audio feedback wherein the identified degradation is identified as one of the transmission degradation and the perceptual degradation.

23. The system of claim 22, wherein the transmission degradation comprises at least one of a tiling degradation, a freezing degradation, and an audio synchronization degradation, and wherein the perceptual degradation comprises at least one of a fuzzy picture, a grainy picture, and a dingy picture.

* * * * *